United States Patent [19]
Westin et al.

[11] Patent Number: 5,761,422
[45] Date of Patent: Jun. 2, 1998

[54] TRANSFERRING ADDRESS OF DATA IN BUFFER MEMORY BETWEEN PROCESSORS USING READ-ONLY REGISTER WITH RESPECT TO SECOND PROCESSOR

[75] Inventors: Håkan Erik Westin, Märsta; Jan Olov Tryggveson, Järfälla, both of Sweden

[73] Assignee: Telefonaktiebolaget LM Ericsson, Stockholm, Sweden

[21] Appl. No.: 408,353

[22] Filed: Mar. 22, 1995

[51] Int. Cl.⁶ ............................................. G06F 7/22
[52] U.S. Cl. .................... 395/200.43; 395/200.31; 395/200.35; 395/875
[58] Field of Search ................. 395/375, 200.08, 395/200.15, 287, 250; 364/200

[56] References Cited

U.S. PATENT DOCUMENTS

| 4,323,967 | 4/1982 | Peters et al. | 395/287 |
| 4,608,631 | 8/1986 | Stiffler et al. | 395/293 |
| 4,669,044 | 5/1987 | Houser et al. | 395/200.08 |
| 5,530,838 | 6/1996 | Hisano | 395/478 |

FOREIGN PATENT DOCUMENTS

| WO93/19544 | 9/1993 | WIPO. |
| WO94/08308 | 4/1994 | WIPO. |

OTHER PUBLICATIONS

European Standard Search Report. Date of completion of Search: 26 Apr. 1995.

Primary Examiner—Parshotam S. Lall
Assistant Examiner—Gautam R. Patel
Attorney, Agent, or Firm—Burns, Doane, Swecker & Mathis, L.L.P.

[57] ABSTRACT

Method and system for providing a link protocol facilitating the transfer of data between processors is described. By providing command and interrupt source registers, flow control, fragmentation of data, and other data functionality control can be supported. One exemplary embodiment describes a link protocol for data transfer between a host processor and a radio modem using a PCMCIA interface.

3 Claims, 2 Drawing Sheets

TRANSFERRING ADDRESS OF DATA IN BUFFER MEMORY BETWEEN PROCESSORS USING READ-ONLY REGISTER WITH RESPECT TO SECOND PROCESSOR

BACKGROUND

The present invention relates generally to methods and systems for transferring data between processors and, more particularly, to protocols for facilitating, and providing needed functionality to, such data transfers.

Communications between data-handling devices are often made over serial interfaces. Serial interfaces commonly handle bits which are transmitted sequentially in a raw bit stream. An exemplary serial interface known as a UART (Universal Asynchronous Receiver/Transmitter) groups the serial bits into chunks of eight bits commonly known as a "byte." Each byte that is transferred results in an interrupt signal being sent to the central processor unit (CPU).

For devices that are connected over a bus structure, it is possible to communicate in a more efficient way. For example, for CPUs that can communicate using data blocks, a raw bit stream is not an efficient way to communicate. Consider a data block that consists of 512 bytes. If each incoming byte is handled by a serial interface such as a UART, then the CPU gets 512 interrupts for that data block. If instead the data is transferred in a block oriented manner, then the CPU would receive only one interrupt.

In addition to serial interfaces, the following other conventional mechanisms are used to transfer data between processors.

Dual Port Memory

Dual port memory devices provide storage and retrieval access to multiple processors. For example, a first processor can store data in a dedicated memory area and signal a receiving processor that the data has been transferred. The receiving processor can then access the data in the dual port memory.

Direct Memory Access (DMA)

A sending processor sets up a DMA channel and moves data directly into a receiving processor's memory. The sending processor then signals the receiving processor to make same aware that new data is available.

DMA-Serial Interface

A combination of DMA and serial transmission where the receiving processor is made aware of a transfer after a predefined number of bytes are transferred or after another predefined event occurs.

Buffered Serial Interface

Instead of providing an interrupt signal to the receiving processor for each transferred byte, an interrupt is given when an amount of data in a buffer reaches either a low or a high threshold or after a predefined time period has elapsed. This technique requires that the sending and receiving processors can handle several and variable numbers of bytes on each interrupt. In addition to their inherent inefficiency, serial interfaces and other conventional data transfer techniques suffer from a lack of control functionality such as error handling, flow control and the like. Such control functionality is, however, found to a greater degree in packet switched communication networks.

Packet Switched Networks

Packet switched communication networks evolved from the need to conserve data communication resources. Since data is sent in discrete packets, rather than as a continuous transmission, gaps in communication on one connection can be efficiently utilized by providing packets from other connections to fill those gaps. Since there is no direct connection between terminals in a packet switching environment, the link is called a virtual connection. Rather than being readily identified by its association with a direct, physical channel, a connection on a packet switched network using a virtual channel is instead determined by a plurality of identifiers. These identifiers, and other information needed to provide smoothly flowing communications in packet switched networks, are provided by protocols which define the rules of communicating on a packet switched network. These rules are also needed so that system programmers and developers have a common baseline from which to design compatible systems.

To summarize, the existing technology does provide for the movement of data between processors per se, but does not include a link protocol for block-oriented transfer of data between processors. Therefore, these conventional products cannot provide link functionality, such as secured transfer of data, support for block fragmentation and flow control.

SUMMARY

These and other drawbacks and deficiencies of conventional communication methods and systems are overcome according to the present invention which provides a novel link protocol that can be, for example, used to provide link functionality to conventional data transferral mechanisms. Command registers are provided to control data link functionality regardless of the underlying data transfer mechanism which is employed. Each data link function is associated with a bit in a command register.

BRIEF DESCRIPTION OF THE DRAWINGS

The foregoing, and other, objects, features and advantages of the present invention will be more readily understood upon reading the following detailed description in conjunction with the drawings in which.

DETAILED DESCRIPTION

In order to provide a complete description of the present invention including its attendant advantages and benefits relative to conventional data transfer techniques, an exemplary embodiment will be described at a relatively high level of abstraction. Subsequently, a more detailed example will be discussed by way of an exemplary PCMCIA (Personal Computer Memory Card International Association) implementation.

Figure 1:
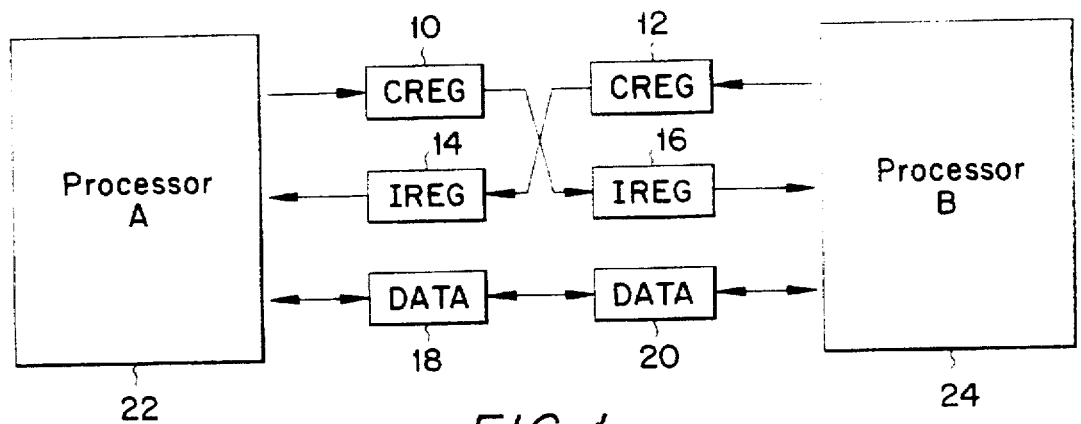
FIG. 1 illustrates an exemplary system for transferring data between processors according to the present invention.

FIG. 1 illustrates the link registers 10–20, specifically, CREGs (command registers) 10 and 12, IREGs (interrupt source registers) 14 and 16 and DATA registers 18 and 20, used to implement exemplary embodiments of the present invention. The registers of FIG. 1 can be logical registers, meaning that they exist as temporary, memory-resident registers rather than physical, hardwired circuitry. Thus, these registers can be configured as memory spaces having predetermined I/O addresses within a memory device accessible by plural processors. These processors are denoted "Processor A" and "Processor B" in FIG. 1. To use less memory space, the CREG 12 and IREG 14 (and/or CREG 10 and IREG 16) may have the same address in memory. In such an implementation the CREG can be write only and the IREG can be read-only. These registers can be interrupt driven or updated using a polling technique.

In operation, processor A will transmit data transfer commands to CREG 10 and receive data transfer indications from IREG 14. According to this exemplary embodiment of the present invention, the CREG and IREG registers each comprise a plurality, for example eight, bits each of which is associated with a predetermined function described below. These functions are active when they are set, e.g., when that bit field has a value of 1. This means that in order to send commands from the processor to the associated CREG, the processor does not need to go through the exercise of reading the register, masking the bits in the register, and then writing to the register. Instead, a Boolean function, such as the OR function, is built into the CREG so that a write command to the CREG only sets those bits in the command having a value of 1. Those skilled in the art will readily appreciate that other Boolean functions could be built into the CREG to provide any desired command change functionality. The command sent to the CREG can result in a corresponding change in the IREG associated therewith. Thus if, for example, processor A sends a command to CREG 10 indicating that data has been written into the data register 20, then the IREG 16 would indicate to the processor B that data is available for retrieval.

The DATA registers 18 and 20 can also be viewed as memory addresses. The technique by which data is actually transferred to and from DATA registers 18 and 20 will be dependent upon the technology available in the system. Exemplary implementations include:

- Dual port memory that is read from/written to using an internal counter, wherein the buffers are controlled by CREG/IREG.
- DMA channels, controlled by CREG/IREG and written to when moving data to the receiving processor.
- PCMCIA, in which the processors have a master and slave relationship.
- The data is controlled by CREG/IREG, with the master processor either writing or reading data. The slave processor provides data for the master to read.

Having provided a brief overview of exemplary registers used to transfer data according to the present invention, a more detailed example of a CREG and an IREG is described below. As mentioned earlier, each bit in the registers corresponds to a data control function. Each bit level depiction is followed by a description of the functionality of the bit fields illustrated therein.

| Command Register, CREG | | | | | | | |
|---|---|---|---|---|---|---|---|
| 7 | 6 | 5 | 4 | 3 | 2 | 1 | 0 |
| ECR | | | | PutD | GetD | Err | More |

ECR  Extended CREG.
   This bit field provides an indicator for one or more extensions to the command register. If, for example, more than seven data control functions are desired in an eight bit implementation of the invention, one or more extended registers can be provided. This bit can then be set to 1 when a field has changed in an extended CREG.

-continued

| Command Register, CREG |
|---|
| PutD  Put Done.<br>   The processor that transmits data sets the PutD bit when all data has been written to its DATA register. Setting this bit will set the Dtg bit (described below) in the IREG of the receiving processor.<br>GetD  Get Done<br>   When the receiving processor has read and checked the data, the receiving processor sets the GetD bit and, if an erroneous packet was received, the Err bit. Setting the GetD bit will effect the BufR bit in the transmitting processor's IREG.<br>Err  Error.<br>   Error bit that indicates to the sending processor that the previous packet had erroneous link parameters. Various corrective actions could be performed in response to the setting of this bit, for example, retransmission.<br>More  More<br>   The More bit is used to support fragmented data. A set (e.g., 1) More bit indicates that the next data packet should be concatenated with the current one. A reset (e.g., 0) More bit indicates that this is the last packet that shall be concatenated. If no fragmentation is needed, the More bit can be set to zero. |

| Interrupt Source Register, IREG | | | | | | | |
|---|---|---|---|---|---|---|---|
| 7 | 6 | 5 | 4 | 3 | 2 | 1 | 0 |
| EIR | | | | DtG | BufR | Err | More |

EIR  Extended IREG.
   Like the ECR, the EIR provides for a chain of interrupt source registers. Set to 1 when a bit changes in the extended IREG.
DtG  Data to Get.
   The CPU that receives data is notified that data is available.
BufR  Buffer Ready
   When the transmitting CPU detects a set BufR bit, then it recognizes that the receiving CPU is ready for a new data packet. The transmitting CPU needs to check the Err bit when BufR is set to determine if retransmission of the previous packet is desirable.
Err  Error.
   Error bit that indicates to the sending CPU that the previous packet had erroneous link parameters. For example, an incorrect checksum or erroneous packet length. Different remedial actions may be taken, for example, retransmission.
More  More
   The More bit is used to support fragmented data. A set More bit indicates that the next data packet should be concatenated with the current one. A reset More bit indicates that this is the last packet that shall be concatenated. If no fragmentation is needed, the More bit can be set to zero.

Figure 2:
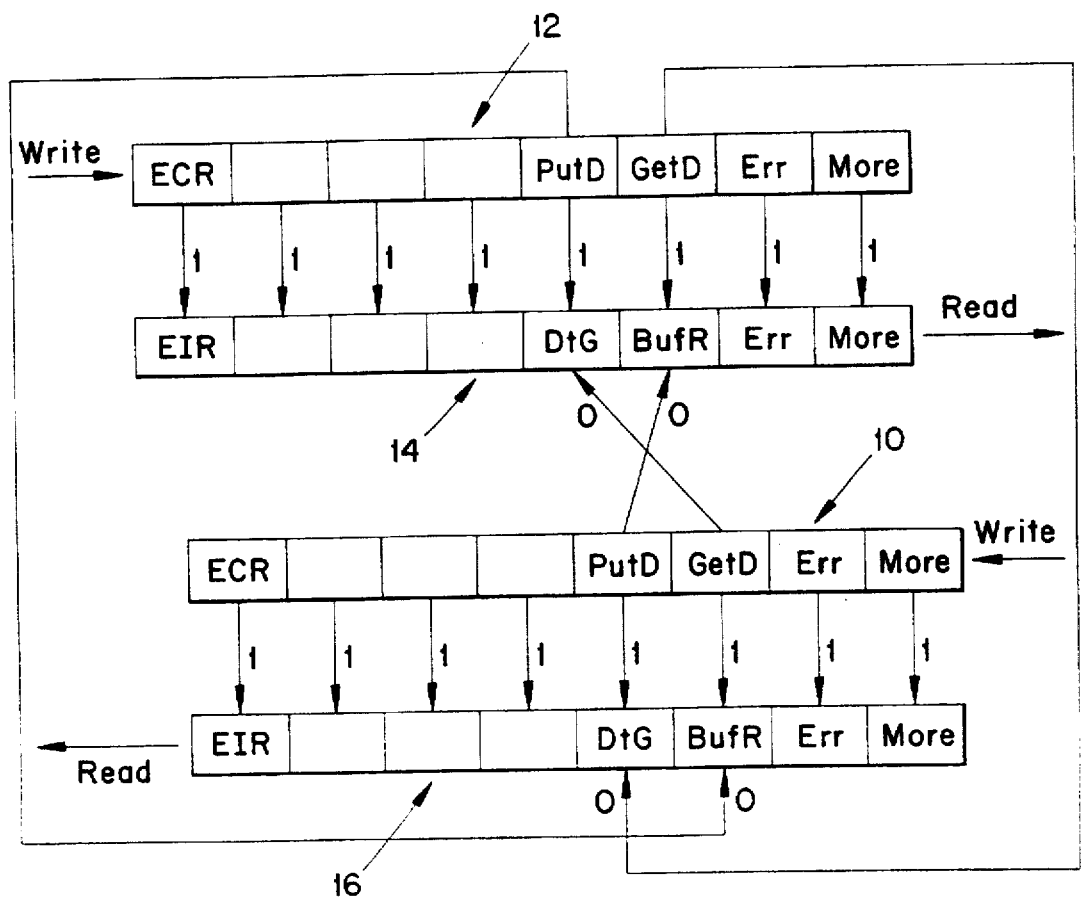
FIG. 2 illustrates exemplary CREG and IREG registers of FIG. 1 at a bit level.

FIG. 2 illustrates the interconnections of the CREG and IREG registers at a bit level. The horizontally oriented arrows pointing toward CREGs 10 and 12 indicate that these registers are primarily written to, while those pointing away from IREGs 14 and 16 are intended to convey that these registers are primarily read from. Those skilled in the art will, however, understand that these are not necessarily write only and read only registers, respectively.

Note that for each bit field of CREGs 10 and 12 that is set, a corresponding field in its respective IREG 16 and 14 is set. This feature is illustrated by the "1"s next to each of the arrows between these registers in FIG. 2. For example, if an extended register set is implemented, and processor A has invoked one of the functions managed by the extended register by setting a bit field therein, bit ECR will be set in CREG 10. This will result in the corresponding ERI field in IREG 16 being set so that processor B will recognize that it must read the extension interrupt register as well as the base interrupt register 16 illustrated in FIG. 2.

Several blank fields follow the ECR and EIR bit fields in the CREGs and IREGs, respectively. However, those skilled in the art will appreciate that additional data control functions can be added in place of those blank fields which are handled in a similar manner to those set forth in the bit fields which are used in the exemplary embodiment of FIG. 2. For example, when the PutD field in CREG 12 is set, the corresponding DtG field in CREG 14 will also be set indicating that data has been transferred to a data location for receipt by Processor A. At the same time, the BufR field for IREG 16 is set to zero indicating that transmitting processor, in this case Processor B, does not currently have control of the buffer. When Processor A has read and checked the data, it would then set the GetD bit in CREG 10 which in turn results in the buffer ready bit of IREG 16 being set, i.e., Processor A has completed its read and returns the buffer to Processor B. At the same time, the DtG field of IREG 14 is reset to zero.

If the receiving processor wants to temporarily stop the flow of incoming data, it can do so by simply not returning the buffer to the transmitting processor, i.e., by waiting to implement the GetD command. If a processor receives an illegal packet, it can set the error bit in its CREG when it returns the buffer to the transmitting processor. Errors can include, for example, illegal checksum values, incorrect packet length, etc. If fragmentation is used, then the More flag provides support for this feature. For example, if a packet includes 500 bytes and the buffer only has room for 50 bytes, then the transmitting processor needs to send 10 smaller packets of 50 characters each. In such a case, the first nine packets would be sent with the More bit set to, for example, one, and the tenth packet would have the More bit set to zero to indicate that this is the end of the overall packet.

Figure 3:
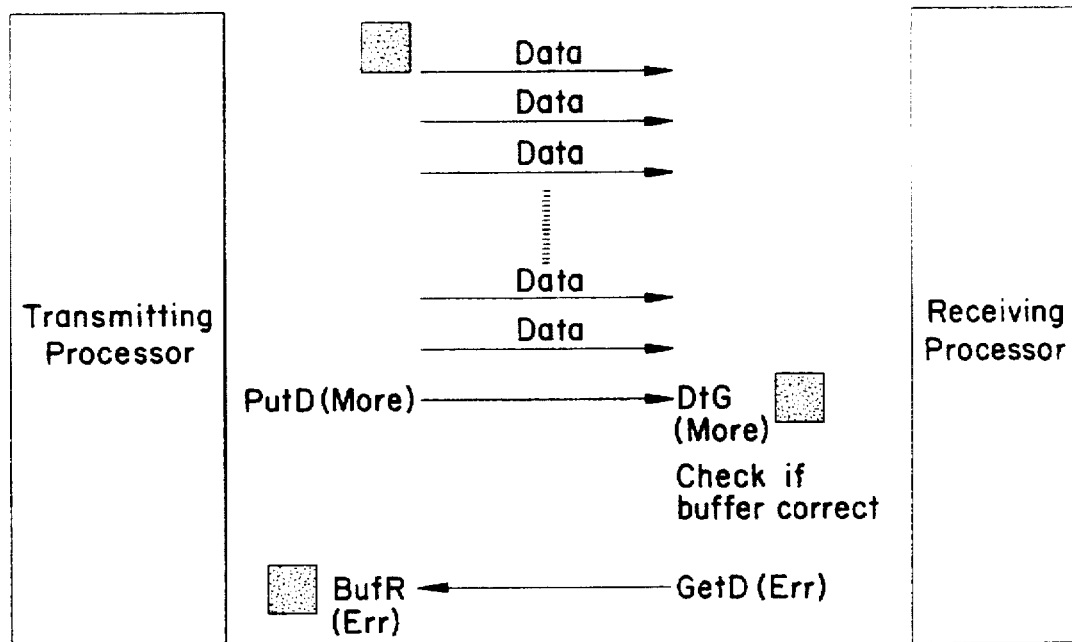
FIG. 3 illustrates an exemplary data flow using a link protocol according to an exemplary embodiment of the present invention.

Thus, a typical data flow could be illustrated as set forth in FIG. 3. Therein, arrows pointing to the right refer to activities by the transmitting processor in this diagram, whereas the arrow to the left refers to activities performed by the receiving processor. Initially, data is transferred to the buffer by the transmitting processor. Since the buffer is available to only one processor at a time, the darkened rectangle indicates which processor has control of the buffer. Initially the transmitting processor has control of the buffer to move data therein. After a certain number of data transmission cycles, the packet will be completed and the PutD bit in the CREG of the transmitting processor will be set. Optionally, the More bit can be set if fragmentation is being supported. This results in the DtG bit of the IREG associated with the receiving processor being set and possibly the More bit of this IREG as well. At this time, the receiving processor has control of the buffer and checks to see if the information in the buffer is a legal packet. After it has completed this activity, the receiving processor sets the GetD bit of its CREG and, if an erroneous packet was received, the Err bit as well. As a result, the BufR bit of the transmitting processors IREG is set and, potentially, the Err bit as well.

Having provided an overview of link protocols according to the present invention, a specific implementation example will now be provided wherein a link protocol according to the present invention is used to handle data transfers in a PCMCIA environment. For example, the following example could be implemented in a computer having a radio card which links it to a wireless network. Therein, the master processor would be the computer processor while the radio card would include a slave processor. This exemplary embodiment illustrates communications between the master and slave processors over a PCMCIA interface.

Figure 4:
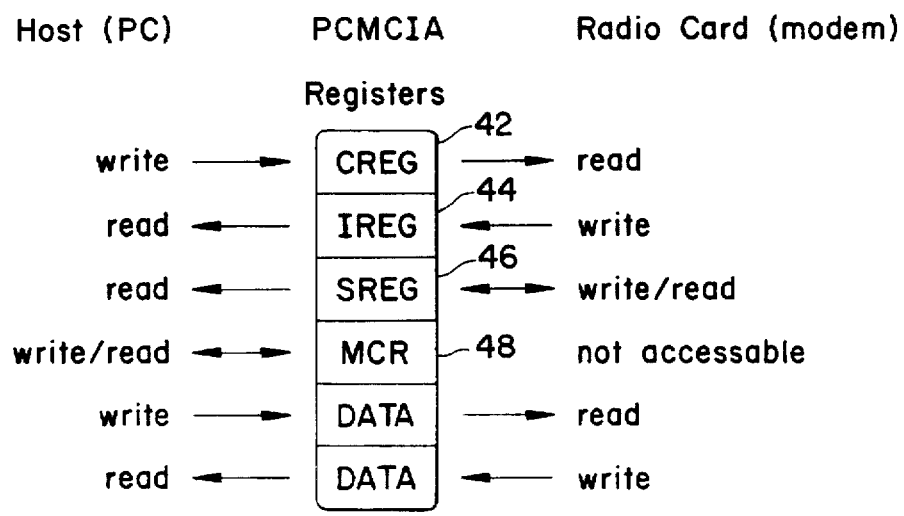
FIG. 4 illustrates another embodiment of the present invention for transferring data between a host processor and a radio modem.

FIG. 4 presents a schematic picture of a modem hardware interface according to this exemplary embodiment of the present invention. Therein, the registers used to implement this exemplary embodiment are described with respect to their access mode for both the master processor and the slave processor. Note that CREG 42 and IREG 44 depicted in FIG. 4 each represent one of the CREG and IREG combinations described above with respect to FIG. 1. In other words, this embodiment of the present invention is one in which both the CREG and IREG share the same I/O address to conserve memory space. SREG 46 is a status register, and MCR 48 is a modem control register. Each of the registers illustrated in FIG. 4 are described in more detail below including a bit level description of their functional fields.

| Command Register (CREG) | | | | | | | |
|---|---|---|---|---|---|---|---|
| 7 | 6 | 5 | 4 | 3 | 2 | 1 | 0 |
| — | TxOp | — | — | PutD | GetD | Err | — |

TxOp  Transmitter operate.
      The host sets the TxOp bit to change the operation mode of the
      transmitter. The transmitter modes are, for example,
      permitted/prohibited. The transmitter mode can be read from
      the SREG at bit TxB. The values of the TxOp bit are:
      0 = No change, and
      1 = Change mode.
PutD  Put Done.
      The host sets the PutD bit when the last byte of data has been
      written to the radio card. Setting this bit resets the BufRdy bit
      in IREG. The values of the PutD bit are:
      0 = Not active, and
      1 = All data written.
GetD  Get Done.
      The host sets the GetD bit when the last byte of data has been
      read from the radio card. Setting this bit resets the DtGet bit in
      IREG. The values of the GetD bit are:
      0 = Not active, and
      1 = All data read.
Err   Error in transfer.
      This bit is set if the host has detected an error in the block of
      data read from the radio card. The values of the Err bit are:
      0 = No error, and
      1 = Error.
—     Reserved, set to be 0 and should be ignored.

| Interrupt Source Register (IREG) | | | | | | | |
|---|---|---|---|---|---|---|---|
| 7 | 6 | 5 | 4 | 3 | 2 | 1 | 0 |
| SRegEv | — | — | — | BufRdy | DtGet | Err | — |

SRegEv  Event in Radio Status Register.
        The SRegEv bit indicates to the host that a change has occurred
        in SREG. This bit is reset when the host reads IREG. The
        values of the SRegEr bit are:
        0 = No event change in SREG, and
        1 = Event change in SREG.
BufRdy  Ready for New Buffer
        The Radio Card sets BufRdy when the input buffer is ready for
        incoming data. Data written to the Radio Card when this flag is
        not set will be ignored. BufRdy is reset when the host sets the
        PutD bit in CREG. The values of the BufRdy bit are:
        0 = Not ready for new buffer, and
        1 = Ready for new buffer.
DtGet   Data to Get
        The Radio Card sets DtGet when it has data for the host to read.
        If the host reads data from the data buffer when this flag is not
        set, invalid data will be read. DtGet is reset when the host sets
        the GetD bit in CREG. The values for the DtGet bit are:
        0 = No data to get, and
        1 = Data to get.
Err     Error in transfer
        This bit is set if the Radio Card has detected an error in the
        block of data written to the radio card. The values for the Err
        bit are:
        0 = No error, and
        1 = Error.
—       Reserved, should be ignored.

| Status Register, SREG | | | | | | | |
|---|---|---|---|---|---|---|---|
| 7 | 6 | 5 | 4 | 3 | 2 | 1 | 0 |
| VccErr | EiC | TxErr | — | — | Net | TxB | TxI |

VccErr  The Radio Card sets VccErr after reset if the card has detected an internal Vcc (power) error. This bit indicates the radio card is not functioning properly. The host can issue a reset to the card if this bit is set. The values for the VccErr bit are:
0 = No Vcc error, and
1 = Internal Vcc error.

EiC  Error in card.
An error has been detected internally in the Radio Card, which may not perform correctly. The host can issue a reset to the card if this bit is set. The values for this bit are:
0 = No error, and
1 = Error in card.

TxErr  The Radio Card sets TxErr when it detects that the radio has been transmitting longer than allowed. The host can issue a reset to the card if this bit is set. The values for the TxErr bit are:
0 = No error, and
1 = Transmitted longer than allowed.

Net  Net status
The Net bit indicates radio network status. The values are:
0 = No net contact, and
1 = Net contact.

TxB  Transmit Block indicator
The TxB bit indicates if transmission of radio data is permitted or prohibited. The values for this bit are:
0 = Transmission permitted, and
1 = Transmission prohibited.

TxI  Transmit Indicator
The TxI bit indicates the status of the modem transmitter. The values of the TxI bit are:
0 = No transmission, and
1 = Transmitting.

—  Reserved, should be ignored.

| Modem Control Register, MCR | | | | | | | |
|---|---|---|---|---|---|---|---|
| 7 | 6 | 5 | 4 | 3 | 2 | 1 | 0 |
| — | — | — | — | IntEn | Reset | — | — |

IntEn  Interrupt enable
The host enables/disables interrupts from the Radio Card using this bit. As a default, the interrupts are enabled. The values are:
0 = Interrupt disabled, and
1 = Interrupt enabled.

Reset  Soft reset
Setting this bit resets the Radio Card with the exception of the PCMCIA interface. For example, the logic handling the link protocol and communication can be reinitialized without reinitializing logic handling the PCMCIA's status. Soft reset is intended to be used for boot purposes. The values are:
0 = No reset, and
1 = Reset.

—  Reserved, must be 0.

Having described the registers and their functionality according to this exemplary embodiment, interactions between the registers used in this link protocol will now be discussed. The command register (CREG) is written to by the host processor in the computer and gives interrupt requests to the radio card. When the host sets one of the CREG bits, an interrupt is generated for the radio card. If the host subsequently sets more bits in the CREG, these newly set bits will not cause any new interrupts since one has already been generated. Instead, the original interrupt request pends until this register is read by the radio card at which time all the bits in the CREG are reset. Bits can be simultaneously written to the CREG by the host and read from the CREG by the radio card without losing data. The link protocol logic ensures that a bit will not be written by the host immediately after the register is read by the radio card and prior to the register being reset by holding interim CREG writes in a virtual or shadow register until the CREG has been reset. These newly written bits would then trigger a new interrupt.

The interrupt source register (IREG) is written to by the radio card and provides interrupt requests to the host. Like the CREG, when the radio card sets a first bit in this register, an interrupt is generated for the host. If the radio card then sets more bits in the IREG before the host reads this register, the setting of these additional bits will not cause any new interrupts to be generated but will just set the bits in the register. The interrupt request pends until the register is read by the host at which time all the bits in the register except for the BufRdy (ready for new buffer) and DtGet (data to get) bits. These bits in the IREG are reset when the host writes the PutD (put done) and GetD (get done) bits to the CREG, respectively. Neither of these resets generates an interrupt.

Thus, it can be seen that the IREG provides flags which are set according to events occurring at the radio card. When those events occur, the radio card updates the flags and writes to the IREG which in turn generates an interrupt to the host processor. For example, the radio card might set a flag in the IREG to inform the host of information generated by the processor in the radio card or to inform the host of network contact. This procedure is independent of the host's generation of interrupts to the radio card despite the master-slave relationship between the two processors.

The status register (SREG) is written to and read by the radio card but read only by the host. Each time the radio card writes to SREG, the SRegEv bit in IREG is set. This provides an interrupt request to the host which will then read SREG. Reading of SREG by the host resets bits EiC, TxErr and VccErr. This register provides status information to the host pertaining to the modem. The modem control register is used by the host to set up the way in which it operates with respect to the radio card. For example, during certain types of processing, the host may wish to disable interrupts from the radio card as well as other external devices so that its processing is uninterrupted. Moreover, the modem control register provides a soft reset function whereby the card can be reset without terminating power to the card.

Exemplary signal flows between the host and radio card according to the foregoing exemplary embodiment of the present invention will now be described. Typically, an initialization process will precede signalling between the host and the radio card. For example, the radio card may initialize itself and set the BufRdy bit in its IREG to inform the host that the radio card is ready for data. Suppose that the host is waiting for this signal to send data to the radio card. At this point, the host would transmit as much data as it desired into the buffer followed by setting the PutD flag in the CREG. This would generate an interrupt to the radio card indicating that it can now test to see if the received data is correct. After receiving the data and performing error detection, the radio card's processor would then write in the IREG at the BufRdy bit which action would generate an interrupt to the host. If there was an error in the transmission, the radio card processor can ignore the block of data and set the error flag in the IREG. The host may then choose to repeat transmission of the block.

For transmitting data to the host from the radio card, the radio card's processor would first write in the DtGet bit of the IREG. After the host has received this interrupt, the radio card would move data into the buffer until finished. The host can, for example, use a length field to know how many data bytes should be read. The length field can be created, for example, by counting a number of bytes written into the buffer and providing the counted number in a register. Alternatively, this information can be provided as part of a frame's overhead information. The host reads the indicated amount of data and checks to see if there are any errors, for example, using a cyclic redundancy check (CRC). The host then informs the radio card of its receipt of the data using the GetD and, possibly, the Err bits of the CREG.

Flow control of block data to be transferred between the host and radio card can be implemented, for example, as follows. If the host wants to move a data block to the radio card, but the radio card does not have any available buffers, the host will find that the BufRdy flag in the IREG will not be set. This means that the radio card is not currently accepting any data, and if the host writes any data while the BufRdy flag is set to zero, that data will be ignored. As soon as the radio card has an available buffer, the radio card will set the BufRdy flag providing an interrupt to the host and allowing the host to send data.

The invention has been described with reference to particular exemplary embodiments, however, it will be readily apparent to those skilled in the art that it is possible to embody the invention in specific forms other than those of the exemplary embodiments described above. This may be done without departing from the spirit of the invention. The exemplary embodiments are merely illustrative and should not be considered restrictive in any way. Thus, the scope of the invention is given by the impended claims, rather than the preceding description, and all variations and equivalents which fall within the range of the claims are intended to be embraced thereby.

What is claimed is:

1. A system comprising:
    a first processor;
    a second processor;
    a buffer which can be controlled by only one of said first and second processors at a time and which receives a first block of data from said first processor; and
    a first register comprising a memory address and a plurality of bits wherein said memory address can be written to by said first processor and is read-only with respect to said second processor, said first register receives a command from said first processor indicating that said block of data has been moved into said buffer and sets a first of said plurality of bits, said first processor generating an interrupt as a result of said first bit being set, said first register also including a second bit which is set by said first processor when any one of the following conditions has occurred:
    (1) a second block of data has been read from said buffer by said first processor;
    (2) said first processor receives an erroneous data block from said second processor;
    (3) said first data block is to be concatenated by said second processor with a subsequent data block; or
    (4) a bit is set in an extended register associated with said first register wherein said second processor, also for receiving said interrupt and reading said first register in response thereto, then reads said first block of data from said buffer.

2. A system comprising:
    a first processor;
    a second processor;
    a buffer which can be controlled by only one of said first and second processors at a time and which receives a first block of data from said first processor;
    a first register comprising a memory address and a plurality of bits wherein said memory address can be written to by said first processor and is read-only with respect to said second processor and, said first register receives a command from said first processor indicating that said block of data has been moved into said buffer and sets a first of said plurality of bits, said first processor generating an interrupt as a result of said first bit being set, said first register also including a second bit which is set by said first processor when any one of the following conditions has occurred:
    (1) a second block of data has been read from said buffer by said first processor;
    (2) said first processor receives an erroneous data block from said second processor;
    (3) said first data block is to be concatenated by said second processor with a subsequent data block; or
    (4) a bit is set in an extended register associated with said first register; and
    a second register, comprising a memory address which can be written to by said second processor and is read-only with respect to said first processor, for receiving commands from said second processor and readable by said first processor, wherein said second processor:
    (1) also for receiving said interrupt and reading said first register in response thereto, then reads said first block of data from said buffer; and
    (2) can move said second block of data into said buffer and subsequently set a bit in said second register that results in an interrupt being sent to said first processor.

3. A system comprising:
    a first processor;
    a second processor;
    a buffer which can be controlled by only one of said first and second processors at a time and which receives a first block of data from said first processor;
    a first register comprising a memory address and a plurality of bits wherein said memory address can be written to by said first processor and is read-only with respect to said second processor and, said first register receives a command from said first processor indicating that said block of data has been moved into said buffer and sets a first of said plurality of bits, said first processor generating an interrupt as a result of said first bit being set, said first register also including a second bit which is set by said first processor when any one of the following conditions has occurred:
    (1) a second block of data has been read from said buffer by said first processor;
    (2) said first processor receives an erroneous data block from said second processor;
    (3) said first data block is to be concatenated by said second processor with a subsequent data block; or
    (4) a bit is set in an extended register associated with said first register; and
    a second register, comprising a memory address and a plurality of bits wherein said memory address can be written to by said second processor and is read-only with respect to said first processor, for receiving commands from said second processor and readable by said first processor, wherein said second processor:
    (1) also for receiving said interrupt and reading said first register in response thereto, then reads said first block of data from said buffer;
    (2) can move said second block of data into said buffer and subsequently set a first of said plurality of bits in said second register that results in an interrupt being sent to said first processor; and
    (3) set a second of said plurality of bits when a bit in an extended register, associated with said second register, is set.

* * * * *